(12) United States Patent
Chen et al.

(10) Patent No.: US 7,779,083 B2
(45) Date of Patent: Aug. 17, 2010

(54) MESSAGE TRANSMITTING QUEUE AND ASSOCIATED METHOD

(75) Inventors: Wei-Pin Chen, Taipei (TW); Chun-Hua Tseng, Chiayi (TW)

(73) Assignee: Via Technologies, Inc., Taipei Hsien (TW)

( * ) Notice: Subject to any disclaimer, the term of this patent is extended or adjusted under 35 U.S.C. 154(b) by 1735 days.

(21) Appl. No.: 10/065,762

(22) Filed: Nov. 15, 2002

(65) Prior Publication Data

US 2004/0004960 A1 Jan. 8, 2004

(30) Foreign Application Priority Data

Jan. 7, 2002 (TW) ............................. 91100090 A

(51) Int. Cl.
*G06F 15/167* (2006.01)

(52) U.S. Cl. ..................................... 709/213

(58) Field of Classification Search ................. 709/213; 711/150; 719/312
See application file for complete search history.

(56) References Cited

U.S. PATENT DOCUMENTS

| | | | | | |
|---|---|---|---|---|---|
| 4,665,484 | A | * | 5/1987 | Nanba ......................... | 711/153 |
| 4,980,852 | A | * | 12/1990 | Giroir et al. ................. | 709/213 |
| 5,142,676 | A | * | 8/1992 | Fried et al. .................. | 711/152 |
| 5,418,913 | A | * | 5/1995 | Fujimoto ..................... | 709/213 |
| 5,434,975 | A | * | 7/1995 | Allen .......................... | 719/312 |
| 5,619,653 | A | * | 4/1997 | Kawauchi .................... | 709/213 |
| 5,724,551 | A | * | 3/1998 | Greenstein et al. .......... | 711/164 |
| 5,724,599 | A | * | 3/1998 | Balmer et al. ................ | 712/43 |
| 6,247,025 | B1 | * | 6/2001 | Bacon ......................... | 707/206 |
| 6,802,066 | B1 | * | 10/2004 | Carden et al. ............... | 719/312 |
| 2003/0182464 | A1 | * | 9/2003 | Hamilton et al. ............ | 709/314 |

OTHER PUBLICATIONS

IEEE, The Open Group; "1003.1, Standard for Information Technology—Portable Operating System Interface (POSIX)"; Dec. 6, 2001; IEEE Inc.; Base Definitions, Issue 6; pp. i-xxi and 247-260.*

* cited by examiner

*Primary Examiner*—Philip C Lee
*Assistant Examiner*—Jeffrey Nickerson
(74) *Attorney, Agent, or Firm*—J.C. Patents

(57) ABSTRACT

A message transmitting queue delivers messages between a source controller and a destination controller. According to the message transmitting request of the source controller, sequentially distribute the free message row of the message transmitting queue, and set the message row to the distributed state. After the source controller writes the message of the message row, set the message row to the written state. At this moment, when the message row is in the position that is read sequentially by the destination controller, a read request is issued, so that the destination controller reads the message according to the read request when the reading completes, clears the distributed signal and the written signal, so that the message row goes back to the free state. When the message transmitting queue has no free message row, a no free message row signal to inform the source controller is issued.

17 Claims, 2 Drawing Sheets

MESSAGE TRANSMITTING QUEUE AND ASSOCIATED METHOD

CROSS REFERENCE TO RELATED APPLICATIONS

This application claims the priority benefit of Taiwan application serial no. 91100090, filed Jan. 7, 2002.

BACKGROUND OF INVENTION

1. Field of Invention

The present invention generally relates to a queue, and more particularly, to a message transmitting queue and the method of operating the same.

2. Description of Related Art

In the system with dual processors, in order to achieve the objective of transmitting a message from one to the other, a message transmitting queue is commonly used as a bridge in between. However, if the message transmitting queue, for example, uses the general serial queue that only has the write pointer and the read pointer, although this may be okay for the single task system, a message misplacement or overlap may occur in the multi-threaded system. Since the size of the transmitted message between the processors may exceed the atomic data read/write size of the processor, the message is actually transmitted to the queue by several times. Moreover, the write pointer cannot move until the message writing completes. Therefore, in the multi-threaded system, when a process does not complete writing the message, the other process may complete writing the message at this time point in advance. So, the previous message is overlapped. When the write pointer moves, the message that does not complete the writing operation is then written by the previous process, thus causing message misplacement. Such a circumstance can be prevented by using the semaphore. However, this will introduce a complicated software operation and impact the system performance.

SUMMARY OF INVENTION

Therefore, the present invention provides a buffer device and the method for operating the same, applied to a multi-threaded system to prevent the misplacement or the overlap of data and command in the transmitted message without using the software semaphore. In some embodiments, the buffer device may be a message transmitting queue.

The present invention provides a buffer device to provide an access media for transmitting messages between the source controller and the destination controller, comprising a plurality of message rows, a write control unit and a read control unit. The plurality of message rows is used to store the message that the source controller intends to transmit to the destination controller. Moreover, each message row at least comprises a write complete flag and a distribution complete flag. The write control unit is coupled to the source controller and the plurality of message rows, wherein when the source controller intends to write the message, the write control unit sequentially outputs the address of the free message row according to the distribution complete flag. When the source controller completes reading the address of the message row, the write control unit sets the distribution complete flag of the message row. When the source controller completes writing the message of the message row, the write control unit sets the write complete flag of the message row, and when the buffer device does not have a free message row, outputs a no free message row signal. The read control unit is coupled to the destination controller and the plurality of message rows. When the write complete flag of the message row that is sequentially read is set, the read control unit issues a read request to inform the destination controller to read the message of the message row, and when the destination controller completes reading the message, clears the distribution complete flag and the write complete flag of the message row.

In the preferred embodiment of the present invention, the write control unit comprises a write pointer control unit, a distribution complete flag multiplexer, and a distribution address multiplexer. The write pointer control unit is used to store a write address of the message row of the buffer device. When the source controller completes reading the write address, the write pointer control unit sets the distribution complete flag of the message row pointed to by the write address and progresses the write address, and when the source controller completes writing the message of the message row, the write pointer control unit sets the write complete flag of the message row. The distribution complete flag multiplexer, that is coupled to the write pointer control unit and the plurality of distribution complete flags of the plurality of message rows, is used to output a not-distributed signal according to the distribution complete flag of the message row pointed to by the write address. The distribution address multiplexer, that is coupled to the distribution complete flag multiplexer and the write pointer control unit, is used to determine and output either the write address or the no free message row signal according to the not-distributed signal.

Furthermore, the read control unit comprises a read pointer control unit, a read buffer, and a read request multiplexer. The read pointer control unit is used to store a read address of the buffer device, wherein when the destination controller completes reading the message of the message row pointed to by the read address, the read pointer control unit clears the distribution complete flag and the write complete flag of the message row and progresses the read address. The read buffer that is coupled to the read pointer control unit and the plurality of message rows is used to output the message of the message row pointed to by the read address. The read request multiplexer, that is coupled to the read pointer control unit and the plurality of write complete flags of the plurality of message rows, is used to output the read request according to the write complete flag of the message row pointed to by the read address.

In the preferred embodiment of the present invention, the size of the message that the source controller intends to transmit to the destination controller is two times of the atomic data read/write size of the source controller. For example, each message comprises data and command, and the size of data and command is the atomic data read/write size of the source controller. It is preferred that the size of the data row and the command row is a multiple of four bytes.

The present invention further provides an operating method of the buffer device for transmitting the message of the source controller to the destination controller. The buffer device comprises a plurality of message rows, a write pointer and a read pointer. Moreover, each message row at least comprises a write complete flag and a distribution complete flag. The method comprises the steps of: at first, setting the write pointer and the read pointer to point to the first message row address; when the source controller completes reading the write pointer, setting the distribution complete flag of the message row pointed to by the write pointer and progressing to the write pointer; when the source controller completes writing the message of the message row, setting the write complete flag of the message row; when the write complete flag of the message row pointed to by the read pointer is set, issuing a read request; and when the destination controller completes reading the message of the message row pointed to by the read pointer, clearing the distribution complete flag and the write complete flag of the message row pointed to by the read pointer and progressing the read pointer.

In the preferred embodiment of the present invention, when the write pointer progresses and points to a message row whose distribution complete flag is set, a no free message row signal is issued to inform the source controller. Wherein, the read request is the interrupt request of the central processing unit.

As shown in the description above, the message transmitting system that applies the buffer device of the present invention allows the source controller individually to write the message such as data and command according to the message row address distributed by the buffer device. Moreover, the destination controller reads the message sequentially according to the write complete flag and the read address. The system operated according to this mechanism prevents the message misplacement and overlap that may happen in the traditional queue, and does not have to use the complicated semaphore that incurs a software burden. Therefore, the system performance is improved significantly.

BRIEF DESCRIPTION OF DRAWINGS

The accompanying drawings are included to provide a further understanding of the invention, and are incorporated in and constitute a part of this specification. The drawings illustrate embodiments of the invention, and together with the description, serve to explain the principles of the invention. In the drawings, FIG. 1 schematically shows a block diagram of the message transmitting queue according to one preferred embodiment of the present invention.

DETAILED DESCRIPTION

Figure 1:
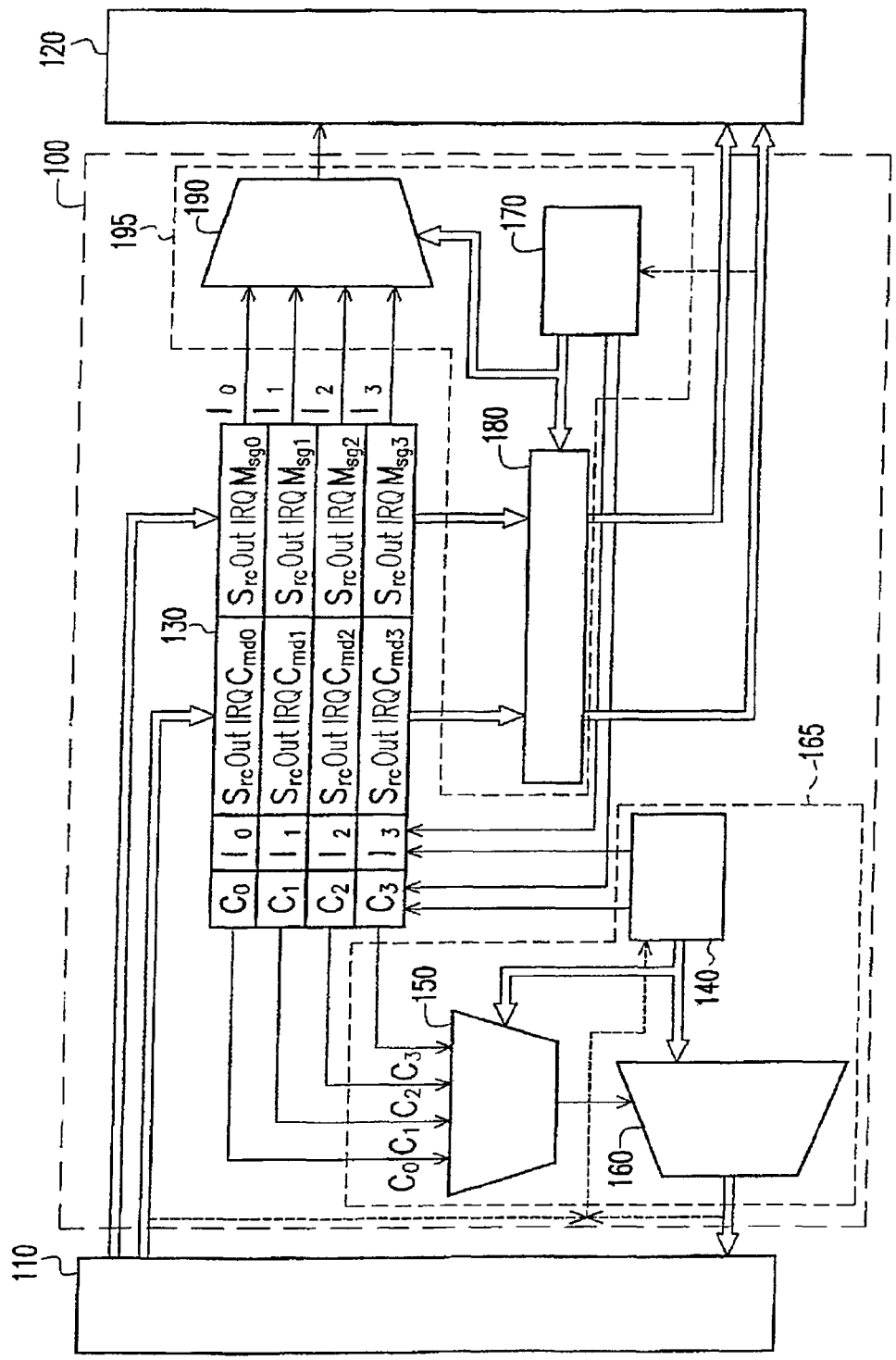

FIG. 1 schematically shows a block diagram of the message transmitting queue of the preferred embodiment according to the present invention. As shown in the diagram, the message transmitting queue 100 is used as the access media for transmitting messages between the source controller 110 and the destination controller 120. The source controller 110 and the destination controller 120 are preferably central processing units, comprising a plurality of message rows 130, a write control unit 165, and a read control unit 195. For clarity, the present invention only uses four of the message rows 130 to explain herein. However, as known to those in the art, the number of the message rows can be extended flexibly to the number that is required. These four message rows 130 are used to store the message that the source controller 110 intends to transmit to the destination controller 120. For clarity, it is assumed that the address is 00, 01, 10 and 11 from top down respectively. Moreover, each message row 130 shown in the diagram respectively comprises the write complete flag I0, I1, I2 and I3, the distribution complete flag C0, C1, C2 and C3, the command rows SrcOutIRQCmd0, SrcOutIRQCmd1, SrcOutIRQCmd2 and SrcOutIRQCmd3 that are used to store the command that the source controller 110 intends to transmit to the destination controller 120, and the data rows SrcOutIRQMsg0, SrcOutIRQMsg1, SrcOutIRQMsg2 and SrcOutIRQMsg3 that are used to store the data that the source controller 110 intends to transmit to the destination controller 120. The size of the command row and the data row is preferably four bytes or a multiple of four bytes depending on the requirement of the message that is transmitted.

The write control unit 165 comprises a write pointer control unit 140, a distribution complete flag multiplexer 150, and the distribution address multiplexer 160. The write pointer control unit 140 is used to store a write address of the message row 130 of the message transmitting queue 100, and when the source controller 110 completes reading the write address, sets the distribution complete flag of the message row 130 pointed to by the write address and progresses the write address. When the source controller 110 completes writing the message of the message row 130, the write pointer control unit sets the write complete flags of the message rows 130. The distribution complete flag multiplexer 150 that is coupled to the write pointer control unit 140 and the distribution complete flags of the message rows 130, outputs a write address or a not-distributed signal according to the distribution complete flags of the message rows 130. The distribution address multiplexer 160 that is coupled to the distribution complete flag multiplexer 150 and the write pointer control unit 140, determines to output either the write address or the no free message row signal according to the not-distributed signal.

The read control unit 195 comprises a read pointer control unit 170, a read buffer 180, and the read request multiplexer 190. The read pointer control unit 170 is used to store the read address of the message transmitting queue 100. When the destination controller 120 completes reading the message of the message row 130 pointed by the read address, clears the distribution complete flag and the write complete flag of the message row 130 are cleared and the read address is increased. The read buffer 180 that is coupled to the read pointer control unit 170 and the message row 130, is used to output the message of the message row 130 pointed to by the read address. The read request multiplexer 190 that is coupled to the read pointer control unit 170 and the write complete flags of the message rows 130, is used to output the read request according to the write complete flag of the message row 130 pointed to by the read address. The read request can be an interrupt request of the central processing unit.

In this embodiment, when the system is reset, the distribution complete flags C0~C3 and the write complete flags I0~I3 are all reset to 0, the write address stored in the write pointer control unit 140 is 00, and the read address stored in the read control unit 170 is 00. In other words, both the write address and the read address point to the message row of address 00. At this moment, the first process of the source controller 110 demands to transmit a message to the destination controller 120, and the first process returns the currently free address 00 of the message row in the write pointer control unit 140 to the source controller 110 via the distribution complete flag multiplexer 150 and the distribution address multiplexer 160. When the reading completes, the write pointer control unit 140 sets the distribution complete flag C0 to 1, and progresses the write address to 1 to point to the next free message row address 01. At this moment, if the second, the third and the fourth process demand to transmit messages, the free message row addresses 01, 10, 11 are read in sequence respectively, the corresponding distribution complete flags C1, C2, C3 are set to 1, and the write address is progressed back to 00 to point to the first message row that has been distributed. If another process demands to transmit a message before any write message has been read out, the process finds out that there is no free message row via the distribution complete flag multiplexer 150 and the distribution address multiplexer 160. Therefore, there is no free message row until the message occupying the first message row is read out to release its space. In one case, the second process has completed writing data and command to the message row at address 01 prior to the first process. At this moment, the write pointer control unit 140 sets the write complete flag I1 to 1. Since the read address at the read pointer control unit 170 is still 00, the read request multiplexer 190 does not issue the read request until the first process completes writing data and command to the message row at address 00 and sets the write complete flag I0 to 1. When the read request multiplexer 190 issues the read request, the destination controller 120 reads the message indicated by read address 00 from the read buffer 180. The read pointer control unit 170 clears the distribution complete flag C0 and the write complete flag I0 and progresses the read address to 01 after the reading has completed. At this moment, since the write complete flag I1 of the message row at address 01 pointed by the read address had been set due to the fact that the second process has written the message in advance. The read request multiplexer 190 issues another read request, so the destination controller 120 continues to read the message at address 01. Then, the read address points to the message row at address 02. The message at address 02 cannot be read until the source controller 110 has written the message and set the write complete flag I2. Therefore, the message can be transmitted efficiently without message misplacement or overlapping.

In other words, the write control unit 165 intends to constantly point to a message row that is currently free. However, whether it is really in a free state is determined according to the distribution complete flag of the currently free message row to prevent any previous message that has not been processed yet from being overlapped. If it is determined that it is really in the free state, the address of the currently free message row is returned to the source controller 110. The returned address of the message row is preferably stored by the firmware till the related message has been written to the message row that is currently free, to prevent message misplacement. If it is determined that the currently free message row is not in the free state, a no free message row signal is returned to the source controller 110. The source controller 110 will issue a request to ask for the free message row from the message transmitting queue 100 after a predetermined period of time.

More particularly, the distribution address multiplexer 160 sequentially reads the free message row addresses 00, 01, 10, 11 generated by the write control unit 165 (or the write pointer) in this embodiment. The four bytes size, the atomic read/write size that can be processed by the controller, is exemplified for description hereafter. The address 00 mentioned above may correspond to the physical address 0x0C00, 0x0C04, and the address 01 mentioned above may correspond to the physical address 0x0C08, 0x0C0C, etc. A no free message row signal is returned to the source controller 110, for example, by returning 0xFFFF to the source controller 110, which falls in an unreasonable addressing range to inform the source controller 110 that there is no free message row available now.

As described above, when the source controller 110 intends to write the message, the write control unit 165 sequentially outputs the address of the message row 130 that is free according to the distribution complete flags. Moreover, when the source controller 110 completes reading the currently free address of the message row 130, the write control unit 165 sets the distribution complete flag of the message row 130. When the source controller 110 completes writing the message of the message row 130, the write control unit 165 sets the write complete flag of the message row 130. When the message transmitting queue 100 does not have any free message row 130, the write control unit 165 outputs a no free message row signal, such as 0xFFFF, to instruct the source controller 110 to wait for a short period of time, so that the queue that is busy can first complete part of its job, and its own resource can be utilized during this waiting period. The read control unit 195 issues a read request to inform the destination controller 120 to read the message of the message row 130 when the write complete flag of the message row 130 that is read sequentially is set. The distribution complete flag and the write complete flag of the message row 130 are both cleared after the destination controller 120 completes reading the message.

Figure 2:
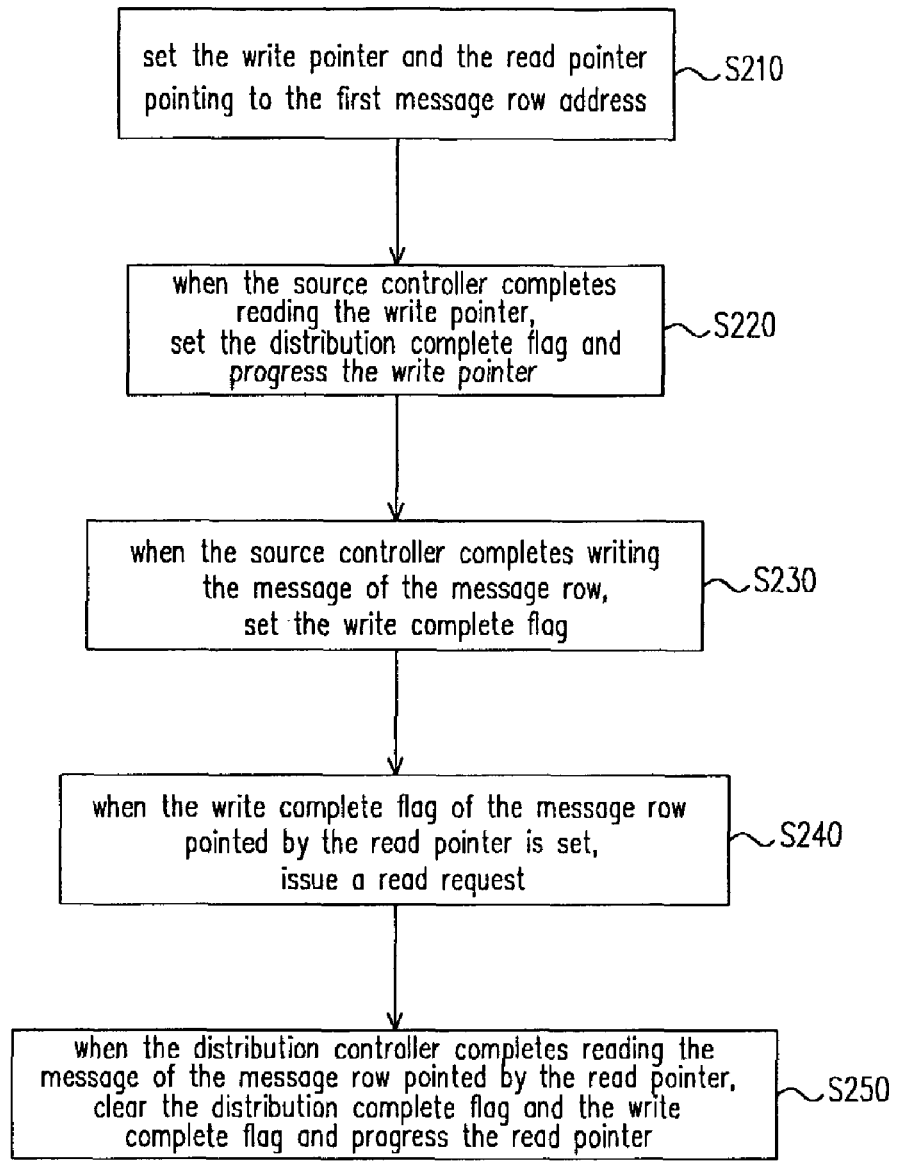
FIG. 2 schematically shows an operating flow chart of the message transmitting queue according to one preferred embodiment of the present invention.

A message transmitting queue is used to transmit a plurality of messages from the source controller to the destination controller, comprising a plurality of message rows, a write pointer and a read pointer. Moreover, each message row at least comprises a write complete flag and a distribution complete flag. The operating method is shown in FIG. 2, comprising the steps of: in step S210, when the system is reset, setting the write pointer and the read pointer to point to the first message row address; in step S220, when the source controller completes reading the write pointer, setting the distribution complete flag of the message row pointed to by the write pointer and progressing the write pointer; in step S230, when the source controller completes writing the message into the message row, setting the write complete flag of the message row; in step S240, when the write complete flag of the message row pointed to by the read pointer is set, issuing a read request; and in step S250, when the destination controller completes reading the message from the message row pointed to by the read pointer, clearing the distribution complete flag and the write complete flag of the message row pointed to the read pointer and progressing the read pointer. When the write pointer progresses and points to a message row whose distribution complete flag is set, a no free message row signal is output to inform the source controller that there is no free message row to be used anymore.

In summary, the present invention discloses a message transmitting queue that is coupled to the source controller and the destination controller and is used to transmit messages between the source controller and the destination controller. The message transmitting queue comprises a plurality of message rows, a write control unit and a read control unit. A plurality of message rows are used to store the messages, and each message row at least comprises a write complete flag and a distribution complete flag. The write control unit having the write pointer is coupled to the source controller and the message rows, and sequentially outputs the addresses of the free message rows to the source controller to store the messages according to the distribution complete flags and the write pointer. The read control unit having the read pointer is coupled to the destination controller and the message rows, and sequentially issues the read requests, for example, interrupt requests to inform the destination controller to read the message according to the write complete flags and the read pointer. When the length of each message exceeds the atomic read/write size that can be processed by the controllers, the write control unit determines whether a free message row exists according to the write pointer and the distribution complete flag of the message row pointed to by the write pointer. If the write control unit determines that a free message row exists, the message row address pointed to by the write pointer is returned to the source controller, the distribution complete flag of the message row pointed to by the write pointer is set, and the write pointer is moved to the next message row. Otherwise, a no free message row signal is returned to the source controller. If the source controller receives the no free message row signal, the source controller issues a request to ask for a free message row from the message transmitting queue after waiting for a predetermined period of time. When the destination controller completes reading a message row, the read control unit clears the distribution complete flag and the write complete flag of the message row pointed to by the read pointer, and moves the read pointer to the next message row. Every time the source controller receives the address of a free message row, the received free message row address is stored by the firmware till the associated message has been written into the free message row.

Therefore, the message transmitting system that applies the message transmitting queue of the present invention allows the source controller individually to write the message according to the message row address distributed by the message transmitting queue. Moreover, the destination controller reads the message sequentially according to the write complete flag and the read address. The system according to this invention prevents message misplacement and overlap that may happen in the traditional queue, and does not have to use the complicated semaphore that incurs software burden. Therefore, the system performance is improved significantly.

Although the invention has been described with reference to the above embodiment thereof, it will be apparent to one of the ordinary skill in the art that modifications to the described embodiment may be made without departing from the spirit of the invention. Accordingly, the scope of the invention will be defined by the attached claims not by the above detailed description.

The invention claimed is:

1. A buffer device, for transmitting a plurality of messages between a source controller and a destination controller, comprising:
   a plurality of message rows, for storing the messages that the source controller intends to transmit to the destination controller, each of the message rows at least comprising a write complete flag and a distribution complete flag;
   a write control unit, coupled between the source controller and the plurality of message rows, used to sequentially output a plurality of free message row addresses according to the plurality of distribution complete flags, wherein when the buffer device still has a free message row, the source controller reads an address of a target message row that is currently free among said plurality of message rows, and the distribution complete flag of the target message row is set by the write control unit; and when the source controller completes writing a message of the target message row, the write complete flag of the target message row is set by the write control unit, and a read request for informing the destination controller to read the message of the target message row is issued; and when the buffer device has no free message row, said write control unit outputs a non-free message row signal; and
   a read control unit, coupled between the destination controller and the plurality of message rows, to issue the read request to inform the destination controller to read the message of the target message row when the write complete flag of the target message row is set, wherein once the destination controller completes reading the message of the target message row in response to the read request, the distribution complete flag set by the write control unit and the write complete flag of the target message row are both cleared by the read control unit, wherein the distribution complete flag has not been cleared by the write control unit before being cleared by the read control unit;
   wherein the plurality of message rows are coupled between the write control unit and the read control unit.

2. The buffer device of claim 1, wherein the write control unit comprises:
   a write pointer control unit, for storing a write address of the target message row, wherein after the source controller reads the write address of the target message row, said write pointer control unit sets the distribution complete flag of the target message row and progresses the write address, and when the source controller completes writing the message of the target message row, the write pointer control unit sets the write complete flag of the target message row;
   a distribution complete flag multiplexer, coupled to the write pointer control unit and the distribution complete flags of the plurality of message rows, to output a not-distributed signal according to the distribution complete flag of the message row pointed to by the write address; and
   a distribution address multiplexer, coupled to the distribution complete flag multiplexer and the write pointer control unit, to alternatively output one of the write address and the non-free message row signal according to the not-distributed signal.

3. The buffer device of claim 1, wherein the read control unit comprises:
   a read pointer control unit, to store a read address of the buffer device, wherein when the destination controller completes reading the message of the message row pointed to by the read address, said read pointer control unit clears the distribution complete flag and the write complete flag of the message row pointed to by the read address, and progresses the read address;
   a read buffer, coupled to the read pointer control unit and the plurality of message rows, to temporarily store the message of the message row pointed to by the read address; and
   a read request multiplexer, coupled to the read pointer control unit and the write complete flags of the plurality of message rows, to output the read request according to the write complete flag of the message row pointed to by the read address.

4. The buffer device of claim 1, wherein each message row further comprises:
   a command row, to store a command that the source controller intends to transmit to the destination controller; and
   a data row, to store data that the source controller intends to transmit to the destination controller.

5. The buffer device of claim 4, wherein the size of the command row is four bytes.

6. The buffer device of claim 4, wherein the size of the data row is a multiple of four bytes.

7. The buffer device of claim 1, wherein the source controller is a central processing unit.

8. The buffer device of claim 1, wherein the destination controller is a central processing unit.

9. The buffer device of claim 1, wherein when the source controller receives the non-free message row signal, the source controller issues a request to ask for a free message row from the plurality of message rows after waiting for a predetermined period of time.

10. The buffer device of claim 1, wherein the read control unit issues the read request when the write complete flag of the target message row is set by the write control unit.

11. A method for transmitting a message of a source controller to a destination controller, through a message transmitting queue having a plurality of message rows, a write control unit and a read control unit, wherein the plurality of message rows are coupled between the write control unit and the read control unit, each of the plurality of message rows at least comprises a write complete flag and a distribution complete flag, the write control unit has a write pointer, and the read control unit has a read pointer; said method comprises the steps of:

setting the write pointer and the read pointer to point to a target message row among said message rows;

reading an address of the target message row pointed to by the write pointer by using the source controller, wherein after the source controller reads the address of the target message row, the distribution complete flag of the target message row is set by the write control unit, and the write pointer is progressed;

writing a message of the target message row by using the source controller, wherein the write complete flag of the target message row is set by the write control unit once the source controller. completes writing the message of the target message row;

once the write complete flag of the target message row is set, issuing a read request to inform the destination controller to read the message of the target message row;

once the destination controller completes reading the message of the target message row in response to the read request, clearing the distribution complete flag set by the write control unit and the write complete flag of the target message row by using the read control unit, wherein the distribution complete flag has not been cleared by the write control unit before being cleared by the read control unit; and progressing the read pointer after the destination controller reads the message of the target message row.

12. The method of claim 11, wherein when the write pointer is progressed and points to a message row whose distribution complete flag is set, a non-free message row signal is asserted to inform the source controller.

13. The method of claim 12, wherein when the source controller receives the non-free message row signal, the source controller issues a request to ask for a-free message row from the plurality of message rows after waiting for a predetermined period of time.

14. The method of claim 12, wherein once the write complete flag of the target message row is set by the write control unit, issuing the read request to inform the destination controller.

15. The method of claim 11, wherein the source controller is a central processing unit.

16. The method of claim 11, wherein the destination controller is a central processing unit.

17. The method of claim 16, wherein the read request is an interrupt request of the central processing unit.

* * * * *